June 10, 1930.  I. EDLAND  1,762,654
FEED MIXER
Filed Dec. 5, 1929
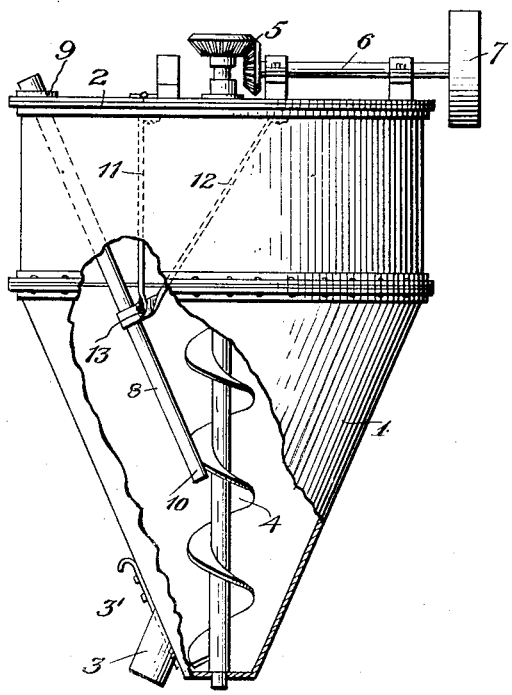
Inventor
Ingval Edland
By H. B. Willson & Co.
Attorneys
Witness
E. E. Hunt Patented June 10, 1930

1,762,654

UNITED STATES PATENT OFFICE

INGVAL EDLAND, OF MONITOR, OREGON

FEED MIXER

Application filed December 5, 1929. Serial No. 411,836.

The invention relates to the mixing of molasses, cod liver oil or other liquid substance with grain feeds and mash for poultry and stock, and it aims to provide an improved apparatus of the vertical cone mixer type, as well as a novel method of mixing, whereby the liquid may be thoroughly distributed in desired quantity throughout a mass of previously dry feed.

With the foregoing in view, the invention resides in the novel subject matter hereinafter described and claimed, description being accomplished by reference to the accompanying drawing, in which the figure is a side elevation partly broken away and in section, showing a vertical cone mixer improved in accordance with my invention.

The drawing above briefly described, illustrates a conventional type of mixer embodying the improvement. The numeral 1 denotes the usual substantially conical casing whose interior constitutes a chamber in which the feed is mixed, the top 2 of said casing being provided with the usual inlet (not shown), while the customary discharge spout 3 and gate 3' are employed at the lower end of the casing. Disposed centrally in this casing, is the usual vertical worm conveyor 4 which may be driven in any suitable way, for instance by the gearing 5, shaft 6 and pulley 7. The worm conveyor 4 constantly agitates, elevates and drops the loose feed in the mixing chamber and the feed so dropped slides down the inclined chamber wall and is eventually received again by said conveyor to be elevated and dropped repeatedly thereby.

To the mixer above described, I add a liquid-introduction pipe 8 which extends from the exterior to the interior of the mixing chamber. In the present showing, the pipe 8 is with the exception of its extreme upper end, within the mixing chamber, said upper end passing through the top 2 at a point near the peripheral edge of the latter and being preferably provided with a flange 9 secured upon said top. The pipe 8 is inclined and its lower end 10 is disposed intermediate the length of the screw conveyor 4 and near the periphery of this conveyor. In a mixer of one ton capacity, the length of the pipe 8 is approximately five feet and three inches and its diameter two inches. It extends substantially five feet below the top 2 and has its lower end 10 spaced about two inches from the conveyor 4, said lower end of the pipe being within the small lower end of the mixing chamber. Thus, as the feed is being positively elevated and agitated by the conveyor 4, it receives liquid from the pipe 8. By thus supplying the liquid to positively agitated speed, thorough mixing is effected, and by discharging the liquid at a point near the lower end of the chamber, it is insured that by the time the feed leaves the upper end of the conveyor and must thereafter move by gravity, it shall be loose and relatively dry to allow such gravitation.

The pipe 8 may be rigidly held in any desired manner. For this purpose, two hanger bars 11—12 have been shown, rigidly secured at their lower ends to the pipe 8 as indicated at 13, while the upper ends of said hanger bars are rigidly secured to the top 2.

The feed in loose form, is placed in the mixing chamber and while continuously driving the screw conveyor 4, the liquid to be mixed with the feed is slowly discharged through the pipe 8, for instance, being poured into the latter with the aid of a funnel. By delivering the liquid at or near the point herein disclosed, unusually thorough mixture of liquid and feed will take place, producing a homogeneous liquid-treated mass.

While the details of construction shown by the drawing are preferably followed, it is to be understood that within the scope of the invention as claimed, variations may be made.

I claim:—

1. An improvement in a dry feed mixer of the type embodying a conical mixing chamber and a central vertical screw conveyor in said chamber for agitating, elevating and dropping the feed; said improvement comprising an inclined liquid-introduction pipe within said chamber, the upper end of said pipe passing through the top of said chamber at a point near the peripheral edge thereof, the lower end of said pipe being disposed within the small lower end portion of the chamber intermediate the ends of and near the periphery of said screw conveyor, and means fixedly mounting said pipe in said chamber.

2. An improvement in a dry feed mixer of the type embodying a conical mixing chamber and a central vertical screw conveyor in said chamber for agitating, elevating and dropping the feed; said improvement comprising an inclined liquid-introduction pipe within said chamber, the upper end of said pipe passing through the top of said chamber at a point near the peripheral edge thereof, the lower end of said pipe being disposed wthin the small lower end portion of the chamber intermediate the ends of and near the periphery of said screw conveyor, and a plurality of hanger bars rigidly secured at their lower ends to the intermediate portion of said pipe and rigidly secured at their upper ends to said top.

In testimony whereof I have hereunto affixed my signature.

INGVAL EDLAND.